Dec. 14, 1948. J. S. ABER 2,456,355
ELASTIC SNAP RING FASTENER
Filed Jan. 13, 1947

Inventor:
Joseph S. Aber,
By W. W. Williamson
Attorney.

Patented Dec. 14, 1948

2,456,355

UNITED STATES PATENT OFFICE 2,456,355

ELASTIC SNAP RING FASTENER

Joseph S. Aber, Philadelphia, Pa.

Application January 13, 1947, Serial No. 721,768

9 Claims. (Cl. 85—7)

My invention relates to a new and useful elastic snap ring fastener and has for one of its objects to provide an exceedingly simple and effective device of this character that is relatively inexpensive in the cost of manufacture, easy of application although highly efficient in operation.

Another object of this invention is to provide a fastener which may, in many instances, be used as a substitute for cotter pins, nuts, split rings, some cotter keys, bent and coiled wires, plain or tapered pins and any other fastening device employed for holding two or more elements together or relative to one another.

Another object of the invention is to provide an elastic ring fastener that is merely projected over a pin, post, axle, shaft or other suitable device, and entered into a recess, such as a groove, where it will remain because of its contractile characteristics, thus eliminating threads, holes, slots and the like and thereby often reducing the cost of manufacture of an article.

A further object of the present invention is to provide an active and static fastener in the form of a ring of elastic plastic, rubber or other suitable material, either round, curvilineal or rectangular in cross section to be passed over a bar-like article and allowed or caused to snap into a groove in said bar-like article.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which.

In carrying out the invention as herein embodied, 10 represents the fastener in the form of an integral endless ring of elastic or expansible and contractible material, such as rubber or elastic plastic, either curvilineal or rectangular and of constant area in cross section. For purposes of illustration I have shown said fastener ring as of round configuration in cross section, in some instances, and square in cross section in another example.

Either type of ring is to be placed in a similarly shaped groove 11 in a cylindrical shank 12 having any general curvilineal contour, such as a post or pin, Figs. 1 to 5, inclusive, 7 and 8, or equivalents thereof, such as studs, projections, bolts and other similar items, or shafts, axles or other things of equal significance. The cylindrical shank 12 is to be considered as that part which extends from an end of an article some distance inwardly beyond the groove.

Figure 1:
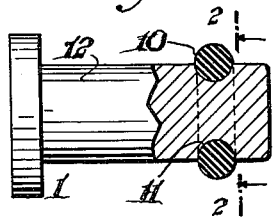
Fig. 1 is a sectional elevation of a post, pin or the like showing an elastic snap ring fastener in position thereon.
Figure 2:
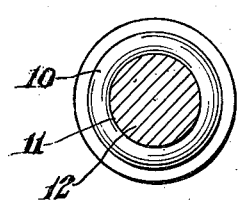
Fig. 2 is a section on the line 2—2 of Fig. 1.
Figure 5:
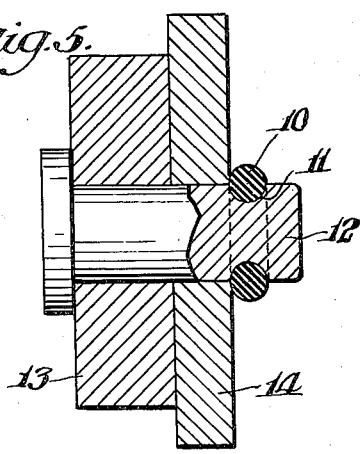
Fig. 5 is a sectional elevation of two articles held together by a pin or post and the ring fastener illustrating an application of the static principle of the fastener.

There are numerous places where such a device may be employed and a few will be specifically mentioned. As depicted in Fig. 5, the piece 12, such as a pin or post may be projected through two articles 13 and 14, such as plates, panels, strips or the like, with the groove 11 located in the piece 12 to assume a position contiguous the outer face of one of said articles, as 14. The ring fastener 10 is then forced over an end of the piece 12 until it snaps into the groove 11 and contacts the article 14 thus firmly and securely holding the two articles together until some extraordinary radial force is applied to the ring for dislodging it from the groove. Said ring substantially fills the groove 11, particularly crosswise of the latter. It will be apparent that the piece 12 as shown in Fig. 5 may be fixed to the article 13 or formed as an integral part thereof so that the article 14 is attached to the other through the medium of the ring fastener.

Figure 6:
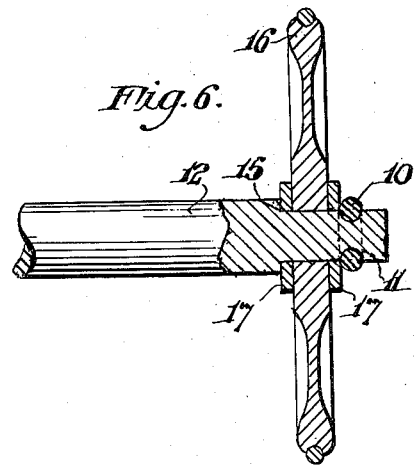
Fig. 6 is a similar view of the fastener used in connection with an axle and wheel.
Figure 4:
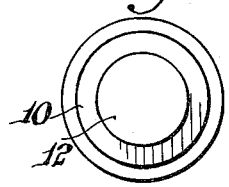
Fig. 4 is an outer end view thereof.
Figure 3:
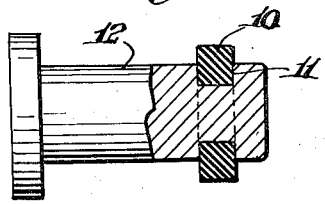
Fig. 3 is a sectional elevation of a post, pin or the like showing an elastic ring fastener of a different configuration mounted in place.

As shown in Fig. 6 the piece 12 constitutes an axle, shaft, trunnion or the like and is represented as having a reduced end to provide a shoulder 15. On the axle is revolvably mounted a wheel 16 between washers 17, the inner one contacting said shoulder 15 and outer one engaging the outer face of the wheel hub. The groove 11 in the axle is so positioned that the outer face of the outer washer, when the parts are assembled, will be contiguous said groove. The ring fastener 10 is forced over the end of the axle and caused to snap into the groove thus fastening the parts in place and holding them in position just as securely as would a nut and with less possibility of becoming accidentally dislodged than would a nut.

Figure 7:
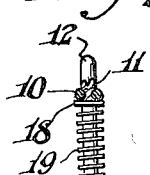
Fig. 7 is a view of pin, such as might be used in an electrical relay, with my fastener holding the parts in place and illustrating an application of the active principle of the fastener as well as its use in a position to receive a thrust effect and functioning as a shock absorber.

In Fig. 7 the part 12 constitutes one of the posts of an electrical relay with an armature arm 18 slidably associated therewith and urged in one direction by a spring 19. Said armature arm is retained against displacement and limited in its outward movement by the ring fastener 10 which is forced over the outer end of the post and allowed to assume a position in the groove 11. The groove in this instance is located at a predetermined position intermediate the ends of the post.

Figure 8:
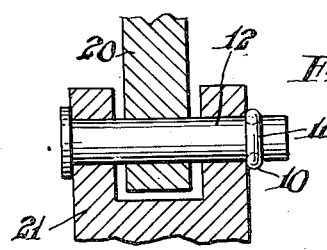
Fig. 8 is a view of a fragmentary sectional elevation of another article, such as a solenoid, in which parts are retained in their respective relations by the fastener.

As illustrated in Fig. 8 the part 12 functions as a pin to connect an end of a solenoid plunger 20 to an operated element 21 of a machine. The part 12 or pin is retained in place by the fastener ring 10 which is forced over the end of the pin and positioned in the groove in said pin located adjacent an outer face of the machine element 21.

In most instances the piece or member 12 is round in cross section thus in forming or shaping such a piece or member the groove to hold the ring fastener may be formed or produced at the same time without additional expense. This invention, therefore, reduces the cost of manufacture of many items which, when nuts or cotter pins are used, require other individual operations, such as the formation of threads, diametrical holes or key slots.

During actual tests this ring fastener lasted fifty times longer than cotter pins and metal horseshoe clips in connection with a number of movable electrical appliances such as solenoids and still in good condition.

Of course I do not wish to be limited to the exact details of construction herein shown and described as these may be varied within the scope of the appended claims without departing from the spirit of my invention.

Having described the invention what I claim as new and useful is:

1. In combination, a pin member having a substantially cylindrical shank and an annular groove near one end of said shank, a second member having a hole therein through which the pin member projects and substantially fills, and an elastic endless non-metallic ring of a cross sectional area approximately one hundred per cent larger than the cross sectional area of said groove and snugly fitted in and substantially filling said groove and projecting outwardly approximately the depth of the groove to act as a thrust bearing for said second member.

2. The structure acording to claim 1 in which the ring is rubber.

3. The structure according to claim 1 in which the ring is elastic non-metallic plastic.

4. The structure according to claim 1 in which the ring is round in cross section.

5. The structure according to claim 1 in which the ring is rectangular in cross section.

6. In combination, a pin member having a substantially cylindrical shank and an annular groove near one end of said shank, a second member having a hole therein through which the pin member projects and substantially fills, and an elastic endless rubber ring, round in cross section, the cross sectional area of said ring being approximately one hundred per cent larger than the cross sectional area of the groove and snugly fitted in and substantially filling said groove and projecting outwardly approximately the depth of the groove to act as a thrust bearing for said second member which abuts the ring.

7. In combination, a pin member having a substantially cylindrical shank and an annular groove near one end of said shank, a second member having a hole therein through which the pin member projects and substantially fills, and an elastic endless rubber ring, rectangular in cross section, the cross sectional area of said ring being approximately one hundred per cent larger than the cross sectional area of the groove and snugly fitted in and substantially filling said groove and projecting outwardly approximately the depth of the groove to act as a thrust bearing for said second member which abuts the ring.

8. In combination, a pin member having a substantially cylindrical shank and an annular groove near one end of said shank, a second member having a hole therein through which the pin member projects and substantially fills, and an endless elastic non-metallic plastic ring, round in cross section, the cross sectional area of said ring being approximately one hundred per cent larger than the cross sectional area of the groove and snugly fitted in and substantially filling said groove and projecting outwardly approximately the depth of the groove to act as a thrust bearing for said second member which abuts the ring.

9. In combination, a pin member having a substantially cylindrical shank and an annular groove near one end of said shank, a second member having a hole therein through which the pin member projects and substantially fills, and an endless elastic non-metallic plastic ring, rectangular in cross section, the cross sectional area of said ring being approximately one hundred per cent larger than the cross sectional area of the groove and snugly fitted in and substantially filling said groove and projecting outwardly approximately the depth of the groove to act as a thrust bearing for said second member which abuts the ring.

JOSEPH S. ABER.

REFERENCES CITED

The following references are of record in the file of this patent:

UNITED STATES PATENTS

| Number | Name | Date |
|---|---|---|
| 325,762 | Over | Sept. 8, 1885 |
| 462,871 | Thacher | Nov. 10, 1891 |
| 491,469 | Carver | Feb. 7, 1893 |
| 837,482 | Libert | Dec. 4, 1906 |
| 1,140,036 | Hella | May 18, 1915 |
| 1,970,078 | Dillon | Aug. 14, 1934 |
| 2,120,530 | Shippee | June 14, 1938 |
| 2,183,085 | Richardson | Dec. 12, 1939 |
| 2,208,620 | Baisch | July 23, 1940 |
| 2,271,711 | Pallett | Feb. 3, 1942 |
| 2,280,032 | Brandt | Apr. 14, 1942 |
| 2,350,311 | Hall | May 30, 1944 |
| 2,367,657 | Boersma | Jan. 23, 1945 |
| 2,414,897 | Rickmeyer | Jan. 28, 1947 |

FOREIGN PATENTS

| Number | Country | Date |
|---|---|---|
| 339,455 | Great Britain | Dec. 11, 1930 |
| 540,916 | France | Apr. 25, 1922 |
| 543,733 | Great Britain | Mar. 10, 1942 |
| 857,574 | France | Sept. 19, 1940 |